United States Patent
Peters

(10) Patent No.: US 8,720,999 B2
(45) Date of Patent: May 13, 2014

(54) FITTING FOR A VEHICLE SEAT

(75) Inventor: Christoph Peters, Wermelskirchen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 78 days.

(21) Appl. No.: 13/382,606

(22) PCT Filed: Jun. 24, 2010

(86) PCT No.: PCT/EP2010/003890
§ 371 (c)(1),
(2), (4) Date: Feb. 7, 2012

(87) PCT Pub. No.: WO2011/003524
PCT Pub. Date: Jan. 13, 2011

(65) Prior Publication Data
US 2012/0126603 A1     May 24, 2012

(30) Foreign Application Priority Data

Jul. 9, 2009 (DE) .......................... 10 2009 032 750

(51) Int. Cl.
*B60N 2/20* (2006.01)
*B60N 2/22* (2006.01)
*B60N 2/235* (2006.01)

(52) U.S. Cl.
USPC .................. 297/367 P; 297/367 R; 297/367 L

(58) Field of Classification Search
USPC ................................ 297/367 R, 367 P, 367 L
See application file for complete search history.

(56) References Cited

U.S. PATENT DOCUMENTS

| | | | |
|---|---|---|---|
| 7,021,715 B2 * | 4/2006 | Umezaki .................. | 297/367 R |
| 7,552,971 B1 * | 6/2009 | Tarusawa et al. .......... | 297/367 P |
| 7,571,963 B2 * | 8/2009 | Peters et al. ............... | 297/367 R |
| 7,614,700 B2 * | 11/2009 | Peters ........................ | 297/367 R |
| 7,669,931 B2 * | 3/2010 | Tarusawa et al. .......... | 297/367 L |
| 7,802,849 B2 * | 9/2010 | Tarusawa et al. .......... | 297/367 P |

(Continued)

FOREIGN PATENT DOCUMENTS

| DE | 101 57 851 A1 | 6/2003 |
|---|---|---|
| DE | 102 53 054 A1 | 6/2004 |

(Continued)

OTHER PUBLICATIONS

International Search Report dated Sep. 30, 2010 as received in corresponding PCT Application No. PCT/EP2010/003890, 6 pages.

(Continued)

*Primary Examiner* — Rodney B White
(74) *Attorney, Agent, or Firm* — Foley & Lardner LLP

(57) ABSTRACT

A fitting for a vehicle seat comprises a first fitting part, a second fitting part which is rotatable relative to the first fitting part about an axis, an eccentric that can be acted on which is rotatably supported about the axis, and several latches for locking the first fitting part radially outward with the second fitting part. The latches are guided by the first fitting part by guides which are guided in the radial direction relative to the axis, and the eccentric acts to move the latches radially outward. The first fitting part defines a rotational bearing seat having a center, the second fitting part defines a rotational bearing seat having a center, and the guides each define one center line. An offset is provided between the centers of the rotational bearing seats and/or the intersection points of the center lines.

12 Claims, 5 Drawing Sheets

(56) References Cited

U.S. PATENT DOCUMENTS

| | | | |
|---|---|---|---|
| 8,459,743 B2 * | 6/2013 | Villarroel | 297/367 P |
| 2007/0108825 A1 | 5/2007 | Yamada et al. | |
| 2007/0137393 A1 * | 6/2007 | Peters | 74/502.4 |
| 2009/0243363 A1 * | 10/2009 | Tarusawa et al. | 297/367 P |
| 2010/0308635 A1 * | 12/2010 | Tame et al. | 297/367 P |
| 2011/0025114 A1 * | 2/2011 | Berndtson et al. | 297/367 P |
| 2011/0254338 A1 * | 10/2011 | Fisher et al. | 297/367 P |

FOREIGN PATENT DOCUMENTS

| | | |
|---|---|---|
| DE | 202005 09 869 U1 | 10/2006 |
| DE | 102005 46 807 B3 | 11/2006 |
| DE | 103 34 089 B4 | 4/2007 |
| JP | 2000-201759 A | 7/2000 |
| JP | 2001-070073 A | 3/2001 |
| JP | 2007-135797 A | 6/2007 |
| JP | 2009-509596 A | 3/2009 |

OTHER PUBLICATIONS

International Preliminary Report on Patentability dated Jan. 17, 2012 as received in corresponding PCT Application No. PCT/EP2010/003890, 10 pages. (English Translated Version).

Office Action received in Japanese Patent Application No. 2012-518787 dated May 21, 2013 (with English Translation).

* cited by examiner

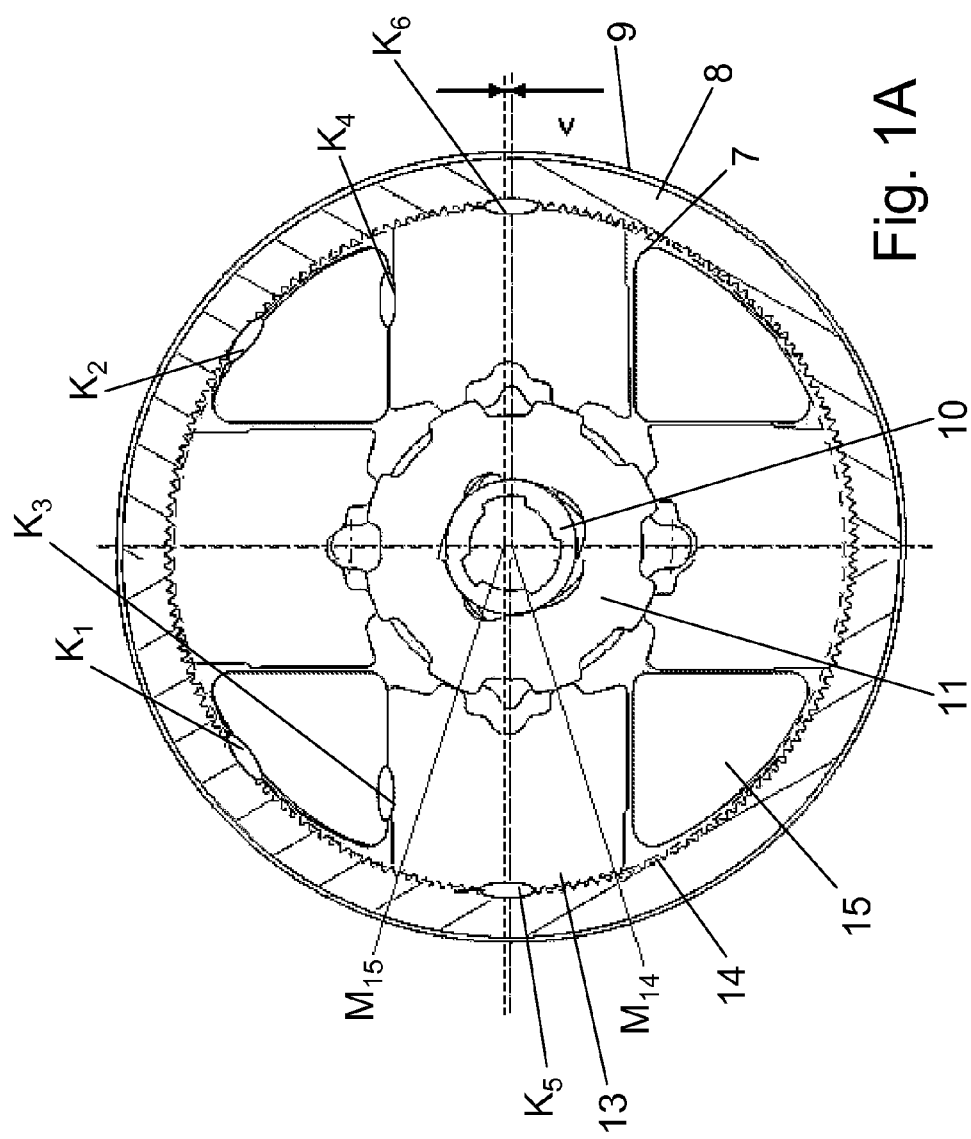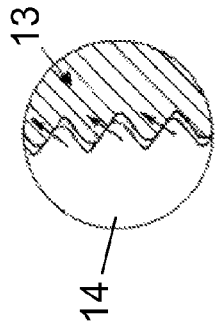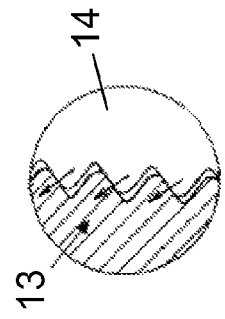

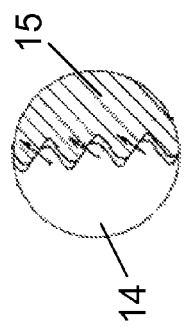
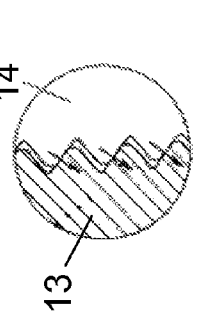
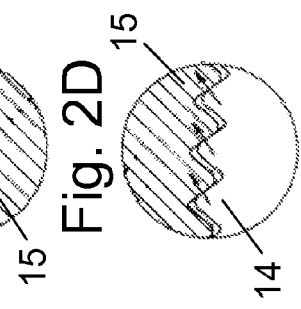
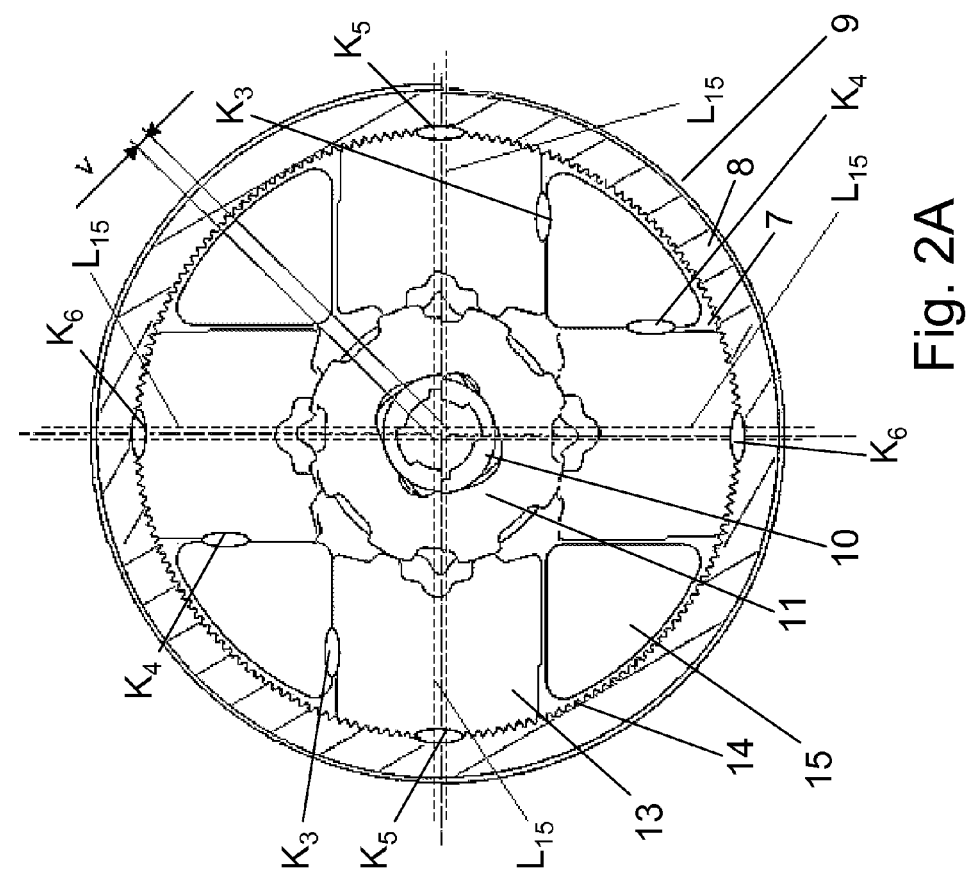

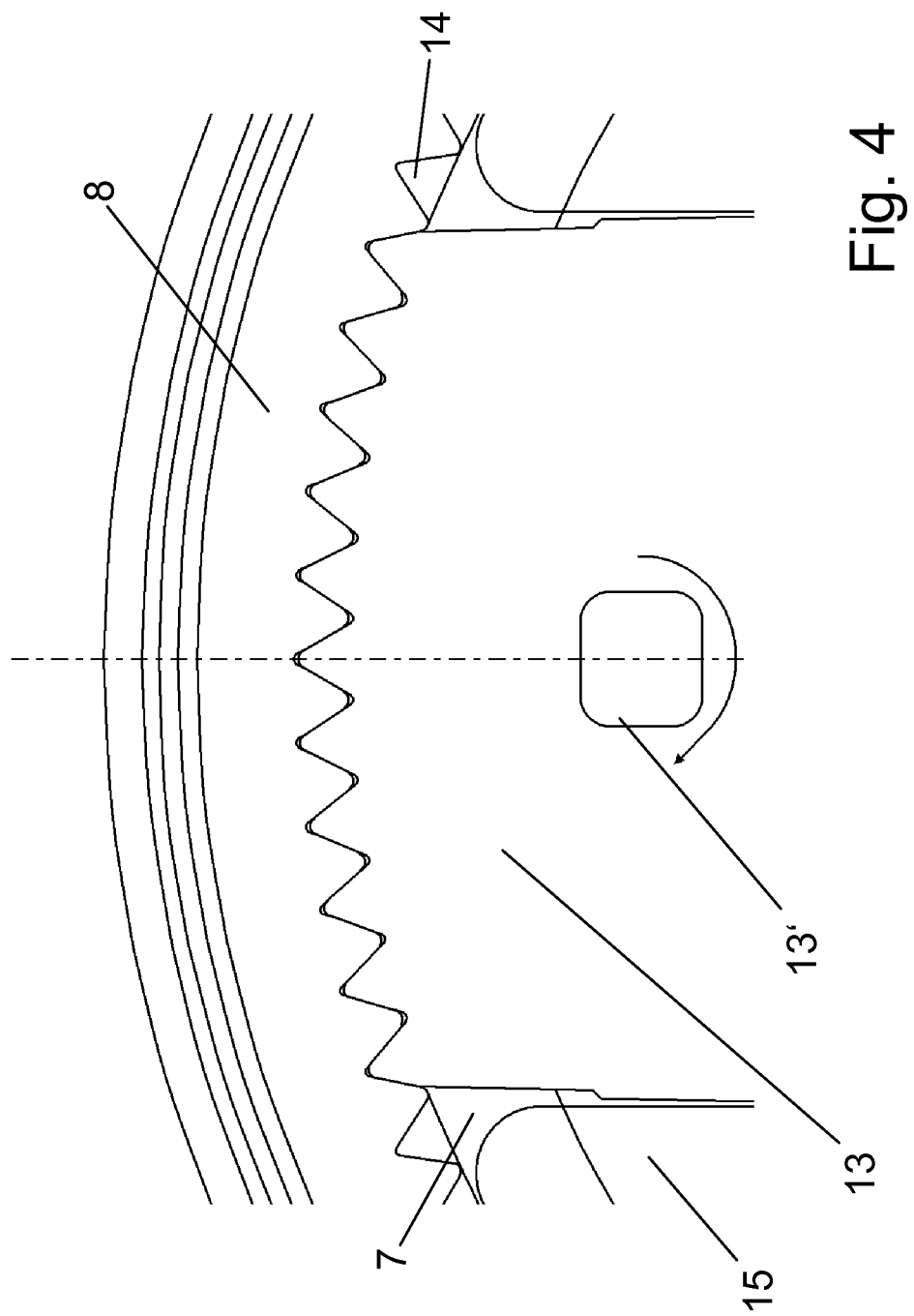

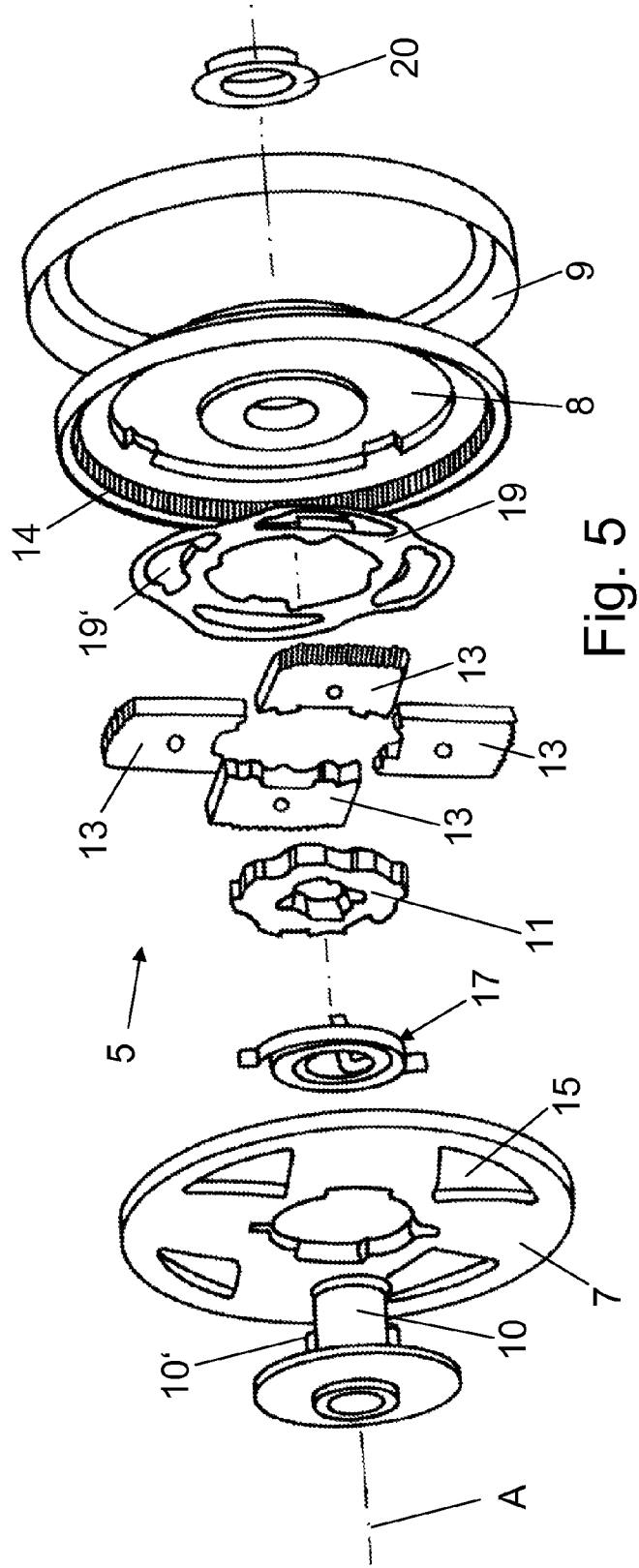
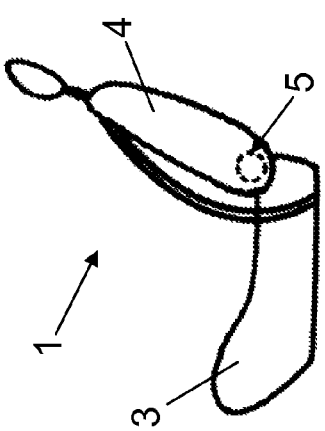
Fig. 5
Fig. 6

FITTING FOR A VEHICLE SEAT

CROSS REFERENCE TO RELATED APPLICATIONS

The present invention is a National Stage of International Application No. PCT/EP2010/003890 filed on Jun. 24, 2010, which claims the benefit of German Patent Application No. 10 2009 032 75.9 filed on Jul. 9, 2009, the entire disclosures of which are incorporated herein by reference.

The invention relates to a fitting for a vehicle seat.

BACKGROUND

A fitting of this type is known from DE 103 34 089 B4. With such a fitting, a backlash in the circumferential direction (torsional backlash), a bearing backlash between the two fitting parts, and a backlash between each latch and the assigned guide can occur. For compensating the torsional backlash, it is proposed, with this known fitting, that one of the three latches is offset in parallel to an axis through the center point of the first fitting part. This has the disadvantage that the latch then is not completely engaged, leading to a loss of strength compared to a complete engagement.

SUMMARY

The object of the invention is to improve a fitting of the type mentioned in the background. This object is achieved according to the invention by a fitting having features described herein.

Owing to the offset of the centers of the rotational bearing seats and/or of the intersection points of the center lines of the guides, the backlash (and potential production tolerances) between the two fitting parts and the latches can be compensated. A small offset in the dimension of the backlash to be expected, for example half as big as it, is sufficient. Backlash compensation takes place by an interaction of the latches with the second fitting part, preferably with a toothed ring thereof, wherein the forces which occur enforce a geometric compensation in the relative arrangement of the fittings and of the latches. The direction of the offset and the number of latches in principle are random, the installation position of the fitting and the required strength can prefer certain values, however.

The resistivity of the fitting with respect to external loads, i.e. the resistivity against crash-imminent malfunctions can, on the one hand, be increased by means of an increased number of latches. The fitting thus can be well used for seats with integrated belt under particularly high loads, if necessary. On the other hand, tooth engagement can be improved by the provided latches being tilted in the event of a locked fitting in the normal case, i.e. outside the event of a crash and, if applicable, in case of misuse. With exactly four latches, which preferably are arranged about the eccentric, offset by 90° each, each of the latches in the normal case can tilt in the opposite direction of the adjoining latches, so that at least two latches are tilted in one direction and two further latches are tilted in the opposite direction. Independently of the direction of load, which has an effect as a torque between the fitting parts, at least two latches are already in a position, in which they can immediately divert the forces from this load. For causing the tilting, i.e. for favoring or forcing it, radially different cams can be configured on the eccentric and/or on the latches, and/or diameters of tip circle and root circle can be provided, which are reduced (compared to the toothed ring) on the latch.

Altogether, the fitting according to the invention thus offers both, backlash compensation and an improved strength.

BRIEF DESCRIPTION OF THE DRAWINGS

The invention is explained in more detail hereinafter with reference to two exemplary embodiments with modifications shown in the drawings, in which FIG. 1A shows a cut through the exemplary embodiment with an offset of the centers of the rotational bearing seats, FIG. 1B shows an enlargement of the contact site $K_5$, FIG. 1C shows an enlargement of the contact site $K_6$, FIG. 2A shows a cut through the exemplary embodiment, with an offset of the intersection points of the center lines of the guides, FIG. 2B shows an enlargement of the contact site $K_5$, FIG. 2C shows an enlargement of the opposite contact site $K_5$, FIG. 2D shows an enlargement of the contact site $K_6$, FIG. 2E shows an enlargement of the opposite contact site $K_6$, FIG. 4 shows a representation of the latch which is tilted due to the reduced toothing diameter, FIG. 5 shows an exploded view of the exemplary embodiment, and FIG. 6 shows a schematic view of a vehicle seat.

DETAILED DESCRIPTION

Figure 3B:
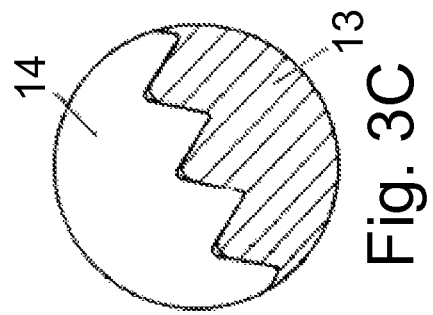
FIG. 3B shows an enlargement of the contact site $K_6$ before tilting.

A vehicle seat 1 of a motor vehicle has a seat part 3 and a backrest 4, which is mounted by means of two fittings laterally at the seat part 3, is pivotable relative thereto and can be locked with different adjustments of inclination. The orientation of the vehicle seat 1 in the motor vehicle and its usual direction of travel define the used directional data. The vehicle seat 1 is configured as a seat with integrated belt, i.e. the upper end of a safety belt is fixed to the backrest 4, more precisely to a belt retractor at the upper edge of the backrest 4. The forces which are introduced to the backrest 4 via the safety belt in the event of a load, must therefore be transferred via the fittings into the seat part 3; this is why at least the fitting 5 on the side of the vehicle seat which is exposed to a higher load, on which the safety belt is fixed, is configured as a high-load fitting.

The fitting 5 is based on the same principle as the fitting described in DE 102 53 054; this is why the disclosure thereof is expressly incorporated herein. The fitting 5 is configured as a detent fitting having a disc shape. The fitting 5 has a first fitting part 7 and a second fitting part 8 which is rotatable relative thereto about an axis A, said fitting parts defining an installation space between them. A hoop-type enclosing ring 9 engages over the second fitting part 8 and is connected with the first fitting part 7, the two fitting parts 7 and 8 thus being axially held together. In the present case, the first fitting part 7 is connected with the seat part 3 and the second fitting part 8 is connected with the backrest 4. An inversed arrangement is, however, possible as well.

In the center of the fitting 5 a driver 10 is arranged, which is rotatably mounted on the second fitting part 8, about the axis A. An eccentric 11, which is arranged in the installation space, is seated on the driver 10 in a rotationally rigid manner, or at least coupled by driving. The eccentric 11 acts upon four identical latches 13, which are offset with respect to each other by 90° each in the installation space about the eccentric 11 and provided, radially outside (with respect to the axis), with a toothing, in order to interact with a toothed ring 14 of the second fitting part 8 which is configured as a hollow wheel. The latches 13 are guided in the radial direction by guide segments 15 of the first fitting part 7. The second fitting part 8 bears on the four guide segments 15 with the toothed ring 14, thus supporting the second fitting part 8 on the first fitting part 7.

A spring arrangement 17 is arranged in a central opening of the first fitting part 7, making the best of the available installation space. For avoiding transverse forces caused by a one-sided engagement on the eccentric 11, the spring arrangement 17 comprises two single springs, each of which is configured as a flat spiral spring, which are arranged about an axis A, rotated through 180° with respect to each other and nested, i.e. the spacings of the corresponding windings are big enough that, between two windings of the one spring, one winding of the other spring and vice versa comes to lie, and that there is still available sufficient travel of the spring for a contraction or an expansion. In the present case, the two springs of the spring arrangement 17 are supported by means of their outer spring ends on the first fitting part 7, and acting upon the eccentric 11 takes place by means of the corresponding inner spring ends.

The spring arrangement 17 acts upon the eccentric 11, so that the latter presses the latches 13 radially outward, i.e. into the toothed ring 14, the fitting 5 thus being locked. A control disc 19 is arranged in the installation space axially between the latches 13 and the second fitting part 8, and in the present case is seated in a rotationally rigid manner on the eccentric 11. The control disc 19 has four slots 19', each of which interacts with one lug 13' of one latch 13 each, wherein the lugs 13' protrude from the latches 13 in the axial direction. In the event of a rotation of the driver 10—and of the eccentric 11 driven thereby and of the control disc 19—counter to the force of the spring arrangement 17, the control disc 19 pulls the latches 13 radially inward, i.e. out of the toothed ring 14, thus unlocking the fitting.

The driver 10 is supported by means of a hub in an opening of the second fitting part 8. Two formed-on ribs 10' of the driver 10 bear against the inside of the second fitting part 8 in the axial direction, while a securing ring 20 which is arranged on the outside of the second fitting part 8—after having been clipped on during assembly of the fitting 5—is seated tightly on the hub of the driver 10. The driver 10 is thus secured axially.

The guide segments 15 define, with their surfaces extending in the circumferential direction and bearing the second fitting part 8, a rotational bearing seat. This rotational bearing seat is part of a cylinder surface. The center of the rotational bearing seat of the guide segment 15 shall be designated $M_{15}$. By means of the rotational bearing seat, the second fitting part 8 is supported on the first fitting part 7. The guide segments 15 pairwise define, with their surfaces extending in the radial direction and guiding the latches 13, for exactly one latch 13 each, one guide with a center line, of which, in FIG. 2A, some center lines are designated $L_{15}$ and, for the sake of clearness, the center lines which are parallel thereto, are designated $L_{15'}$. The toothed ring 14 defines by its tip circle a further rotational bearing seat which is part of a cylinder surface. The center of the rotational bearing seat of the toothed ring 14 shall be designated $M_{14}$.

For reducing backlash, according to the invention an offset v of the fitting parts 7 and 8 is provided. The center lines $L_{15}$, $L_{15'}$ of the guides intersect in a common intersection point which coincides with the center $M_{14}$ of the rotational bearing seat of the toothed ring 14 (since the latches 13 center the toothed ring 14). In contrast thereto, the center $M_{15}$ of the rotational bearing seat of the guide segments 15 is offset by the offset v. The axis A then becomes the instanteneous center of rotation. The offset v can be carried out in any direction. In the ideal case it is exactly as big as half the sum of the fit backlash between the latches 13 and the guide segments 15, which exists in the direction of the offset v. In FIG. 1A, the offset v is selected in an exemplary manner in the vertical direction, wherein its dimension of, for example, approximately 0.15 to 0.25 mm is shown in a disproportionally enlarged manner. To reduce backlash, the six contact points $K_1$, $K_2$, $K_3$, $K_4$, $K_5$ and $K_6$ are interesting, namely $K_1$ and $K_2$ between the two bearing guide segments 15 and the toothed ring 14, $K_3$ and $K_4$ between the said two guide segments 15 and the two latches 13 which are located in the direction of the offset v, and $K_5$ and $K_6$ between said two latches 13 and the toothed ring 14. The offset v leads to the forces, which act in the contact sites $K_5$ (FIG. 1B) and $K_6$ (FIG. 1C) between the latches 13 and the toothed ring 14, forcing both, the toothed ring 14 to the contact sites $K_1$, $K_2$, with the bearing guides segments 15, and the latches 13 to the contact sites $K_3$ and $K_4$ with the same. The free backlash is thus completely compensated.

Additionally or alternatively, the center lines $L_{15}$ and $L_{15'}$ of the diagonally opposed guides (that is to say of the opposed pairs of guide segments 15 each) can be offset in parallel to each other (FIG. 2A), i.e. each center line $L_{15}$ to the center line $L_{15'}$ which is parallel thereto. The center lines $L_{15}$, $L_{15'}$ define an intersection quadrangle, the (bigger) diagonal of which forms the offset v. The direction of the offset v is therefore defined by the sum of the single values (which are to be considered a vector), by which the center lines $L_{15}$, $L_{15'}$ are offset with respect to each other. This direction can be chosen at random. The mode of functioning of the offset v is the same as described before, i.e. the forces in the contact sites $K_5$ (FIGS. 2B and 2C) and $K_6$ (FIGS. 2D and 2E) between the latches 13 and the toothed ring 14 force the latches 13—in the direction of the offset v—in the contact sites $K_3$ and $K_4$ to bear against the guide segments 15 (and the toothed ring 14 to bear against the guide segments 15). The offset v between the center lines $L_{15}$ ideally amounts to the sum of the backlash of the the latches 13 to the guide segments 15 in the direction of the offset v, for example approximately 0.1 to 0.15 mm, said backlash having to be compensated, this again being shown in a disproportionally enlarged manner.

Backlash compensation according to the invention leads to the tooth engagement between the latches 13 and the toothed ring 14 not being complete with all latches 13. In order to increase strength, in particular for the event of a crash, toothe engagement is improved. For this purpose, it is provided for the locked fitting 5 that the latch 13 can tilt with respect to the center lines $L_{15}$, and more precisely already in the normal case, by the tooth engagement between the latch 13 and the toothed ring 14. First eccentric cams 21 and second eccentric cams 22 are configured on the eccentric 11. The four first eccentric cams 21 and the four second eccentric cams 22 form four pairs, wherein, regarded in the circumferential direction of the eccentric 11, the order within one pair changes from pair to pair, i.e. two adjoining first eccentric cams 21 are followed by two adjoining second eccentric cams 22 and vice versa. Each pair is assigned to exactly one latch 13. On each latch 13, on the side which faces the eccentric 11 and offset to the center line $L_{15}$, two latch cams 23 are formed, one of which is aligned and assigned to one first eccentric cam 21 and one to a second eccentric cam 22. When tilting the latch 13, a gap would arise between one of the two eccentric cams 21 and 22 and the assigned latch cam 23. For compensating this gap and/or for preventing it, the eccentric cams 21 and 22 are configured radially different, i.e. in the present case the first eccentric cams 21 radially protrude a little (for example 0.1 mm) over the second eccentric cams 22, while the latch cams are configured radially identically. This solution permits the use of exclusively identical latches 13. Alternatively, the latch cams 23 are configured radially different, and the eccentric cams 21 and 22 are configured radially identically. This implies, however,—in order to maintain the alternating order—higher requirements on the assembly.

Figure 3C:
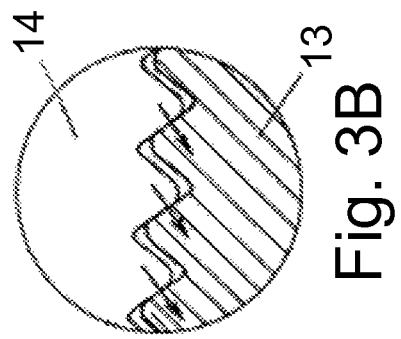
FIG. 3C shows an enlargement of the contact site $K_6$ after tilting.
Figure 3A:
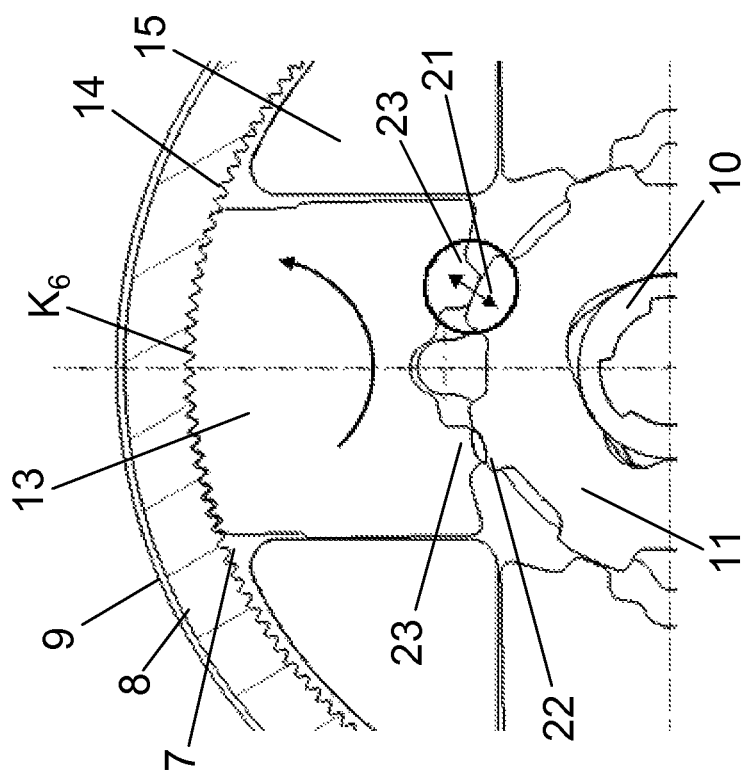
FIG. 3A shows a view of the latch which tilts due to radially different eccentric cams.

When the eccentric 11 acts upon the latches 13, this means in the normal case that initially only the corresponding first eccentric cam 21 acts upon the assigned latch cams 23, thus moving the locking bar 13 radially outward, while, between the corresponding second eccentric cam 22 and the assigned latch cam 23, there is a gap. As soon as the latch 13 engages in the toothed ring 14 (FIG. 3B), the latch 13 tilts, i.e. turns a little, in a direction which is indicated in FIG. 3A by a curved arrow, until the backlash is compensated (FIG. 3C). The latch 13 then acts as a compressive strut and is in contact at three points with one other component of the fitting 5 each, namely with the assigned first eccentric cam 21, i.e. the eccentric 11, the adjoining nearest by guide segment 15, i.e. the first fitting part 7, and the toothed ring 14, i.e. the second fitting part 8. Owing to the alternating order in the pairs of the eccentric cams 21 and 22, the latches 13 tilt in alternating directions, i.e. in the opposite direction of their corresponding neighbours. Two latches 13 each, which are opposed to each other, thus tilt into the same direction, which is opposite to the direction of the other two latches 13 each.

If now force is exercised on the backrest 4, in particular in the event of a crash, for example via the safety belt, the second fitting part 8 is subject to a torque. The second fitting part 8 thus exercises, with the toothed ring 14, a force in the circumferential direction on the four latches 13. For two latches 13 this force, i.e. load, acts in the direction in which they are tilted, so that they can, on the one hand, immediately transfer the force and, on the other hand,—if applicable, under elastic and/or plastic material deformation—tilt a little more, until the latch cam 23 which, up to now, has been free, gets to bear against the second eccentric cam 22, and consequently a gap is no longer present. This small movement of the latches 13 leads, however, to a slightly reduced strength. With a further increase of force, the force is now substantially transferred to the eccentric 11 via the latch-cam 23 which, until now, has been free. For the other two latches 13, the force, i.e. load, acts against the direction in which they are tilted. These two latches 13 therefore tilt against the original tilting direction and thus transfer the force directly to the eccentric 11, via the corresponding first eccentric cam 21. In this case, these two latches 13 resist to the load by an increased strength.

Owing to the tilting in the opposite direction of the latches 13 in the normal case, the same situation applies to a frontal crash and to a rear crash, i.e. the force flow goes through a pair of latches 13 each, with two supported latch cams 23 (and primarily over the latch cam 23 which previously has been free) and through a pair of latches, in which (still) only one latch cam 23 is supported. Strength thus increases as a whole remarkably compared to an arrangement with only two latches, but also compared to an arrangement, in which all latches tilt into the same direction, wherein a lower strength would be opposed to one load direction.

Alternatively or additionally to tilting the latches 13 owing to the radially different cams, tooth engagement can be improved by a modified toothing. For this purpose, the tip circle and the root circle of the teeth of the latches 13 are reduced in their diameter with respect to the root circle and the tip circle of the toothed ring 14, in order to enforce or at least favour tilting. Compared to a tooth engagement with a latch 13 which is not tilted, which takes place primarily within the region of the contact sites $K_5$ and $K_6$ and compared to a tooth engagement with identical diameters and tilted latch 13, the reduced diameters have the advantage that more teeth completely get to engage, for example half of them.

LIST OF REFERENCE NUMERALS 1 vehicle seat
3 seat part
4 backrest
5 fitting
7 first fitting part
8 second fitting part
9 enclosing ring
10 driver
10' rib
11 eccentric
13 latch
13' lug
14 toothed ring
15 guide segment
17 spring arrangement
19 control disc
19' slot
20 securing ring
21 first eccentric cam
22 second eccentric cam
23 latch cam
A axis
$K_1, K_2, K_3, K_4, K_5, K_6$ contact sites
$L_{15}, L_{15'}$ center lines
$M_{14}$ center of the rotational bearing seat of the toothed ring
$M_{15}$ center of the rotational bearing seat of the guide segments
v offset

The invention claimed is:
1. A fitting for a vehicle seat, comprising:
a first fitting part;
a second fitting part which is rotatable relative to the first fitting part about an axis;
an eccentric rotatably supported about the axis; and
a plurality of latches which are guided by the first fitting part by guides such that the plurality of latches are guidable in a radial direction relative to the axis, the eccentric being capable to act on the plurality of latches such that the plurality of latches move radially outward, the plurality of latches being configured to interact radially outward with the second fitting part, wherein a gap is formed between the latches and the guides,
wherein the first fitting part defines a rotational bearing seat having a center, the second fitting part defines a rotational bearing seat having a center, and the guides each define one center line,
wherein the center lines of the guides intersect in a common intersection point which coincides with the center of the rotational bearing seat of the second fitting part,
wherein at least one of (a) the center of the rotational bearing seat of the first fitting part is offset with respect to the common intersection point of the center lines by an offset, (b) center lines of diagonally opposed guides are offset in parallel to each other such that an intersection quadrangle with diagonals is defined with a longer diagonal of the intersection quadrangle forming an offset, and (c) a combination thereof, wherein the first fitting part is provided with guide segments, wherein a pair of the guide segments define one guide each for exactly one latch from the plurality of latches, and wherein the second fitting part is supported by the rotational bearing seat of the first fitting part.

2. A fitting according to claim 1, wherein the offset is smaller than 1 mm.

3. A fitting according to claim 1, wherein the second fitting part comprises a toothed ring with a tip circle, wherein the tip circle defines the rotational bearing seat of the second fitting part, and wherein the second fitting part is supported on the first fitting part by the rotational bearing seat of the second fitting part.

4. A fitting according to claim 3, wherein diameters of a tip circle and a root circle of teeth of the plurality of latches are reduced compared to diameters of a root circle and the tip circle of the toothed ring.

5. A fitting according to claim 3, wherein, with a locked fitting, forces acting between the plurality of latches and the toothed ring force the toothed ring and the plurality of latches to the guide segments.

6. A fitting according to claim 1, wherein the fitting is configured such that, with a locked fitting, forces acting between the plurality of latches and a toothed ring force the toothed ring and the plurality of latches to the guide segments.

7. A fitting according to claim 1, wherein the plurality of latches comprise exactly four latches.

8. A fitting according to claim 1, wherein the plurality of latches are capable of being tilted in the guides, and wherein with a locked fitting, each latch is configured to tilt in an opposite direction of corresponding adjoining latches.

9. A fitting according to claim 1, wherein the eccentric has, for each latch, a first eccentric cam and a second eccentric cam, and wherein the first and second eccentric cams are configured, for an assigned latch, to be radially different and to act upon two latch cams of the assigned latch.

10. A fitting according to claim 9, wherein, in an event of a crash, latches from the plurality of latches which are tilted in a direction of load, are configured to bear, at least temporarily, with the two latch cams on both first and second eccentric cams, and wherein, in the event of the crash, latches from the plurality of latches which are tilted opposed to the direction of load are configured to tilt to another side and each bear at least with one latch cam on the first eccentric cam.

11. A vehicle seat comprising:

a seat part; and a backrest, which is fitted to the seat part by at least one fitting according to claim 1, wherein the backrest is pivotable relative to the seat part and is lockable with different adjustments of inclination.

12. A fitting according to claim 1, wherein the offset is smaller than 0.3 mm.

* * * * *